United States Patent [19]

Schultz, deceased et al.

[11] 4,305,538
[45] Dec. 15, 1981

[54] PORTABLE APPARATUS FOR ASSEMBLING FRAME STRUCTURES

[75] Inventors: Bethel F. Schultz, deceased, late of Harrisburg, Oreg.; by Marjorie Schultz, executrix, Denton, Tex.

[73] Assignee: Robert Schultz, Denton, Tex.

[21] Appl. No.: 90,637

[22] Filed: Nov. 2, 1979

[51] Int. Cl.³ .......................... B27F 7/02; B23P 21/00
[52] U.S. Cl. .......................................... 227/2; 29/430; 144/1 R; 144/2 N; 227/41; 227/48; 227/50; 227/100; 227/101; 227/103; 227/111; 227/152
[58] Field of Search ................. 29/430; 144/1 R, 2 N, 144/3; 227/40, 41, 42, 2, 48, 49, 50, 90, 100, 101, 103, 104, 105, 110, 111, 152, 153

[56] References Cited

U.S. PATENT DOCUMENTS

| | | | |
|---|---|---|---|
| 2,574,163 | 11/1951 | Bamford | 144/309 |
| 3,399,445 | 9/1968 | Carroll | 29/200 |
| 3,564,702 | 2/1971 | Hurn et al. | 29/200 |
| 3,629,931 | 12/1971 | Stanley | 227/111 X |
| 3,685,129 | 8/1972 | Juriet et al. | 227/40 X |
| 3,765,587 | 10/1973 | Davis | 227/100 |
| 3,822,815 | 7/1974 | Davis | 227/40 X |
| 3,851,384 | 12/1974 | Kellner et al. | 227/21 X |
| 4,039,112 | 8/1977 | Schultz | 227/40 |
| 4,133,097 | 1/1979 | Slade | 144/1 R X |
| 4,174,061 | 11/1979 | McDonald | 227/152 |

Primary Examiner—Paul A. Bell
Attorney, Agent, or Firm—Chernoff & Vilhauer

[57] ABSTRACT

Portable apparatus for automatically constructing prefabricated stud walls or other frame structures from standard materials. Elongate studs are placed transversely at spaced intervals between a pair of elongate wall plate members by a reciprocatingly rotating stud-selecting mechanism and a linearly reciprocating spacer mechanism. As each stud is placed between the plate members, it is automatically nailed thereto, forming a portion of the wall frame, after which the completed portion of the frame is advanced an incremental distance along an assembly structure by the spacer mechanism, which pushes on the newly nailed stud to advance the frame to a position for nailing the next succeeding stud, and so forth in automatic cyclic fashion. A semi-automatic sheathing fastener mechanism includes a plurality of fastener guns and an automatically controlled actuation mechanism for placing fasteners at predetermined locations. Apparatus is provided for varying the spacing between wall plates and for reducing overall width of the apparatus for legal highway transport. The apparatus includes self-contained electrically-powered pneumatic and hydraulic systems, and fluid-operated control systems.

12 Claims, 14 Drawing Figures

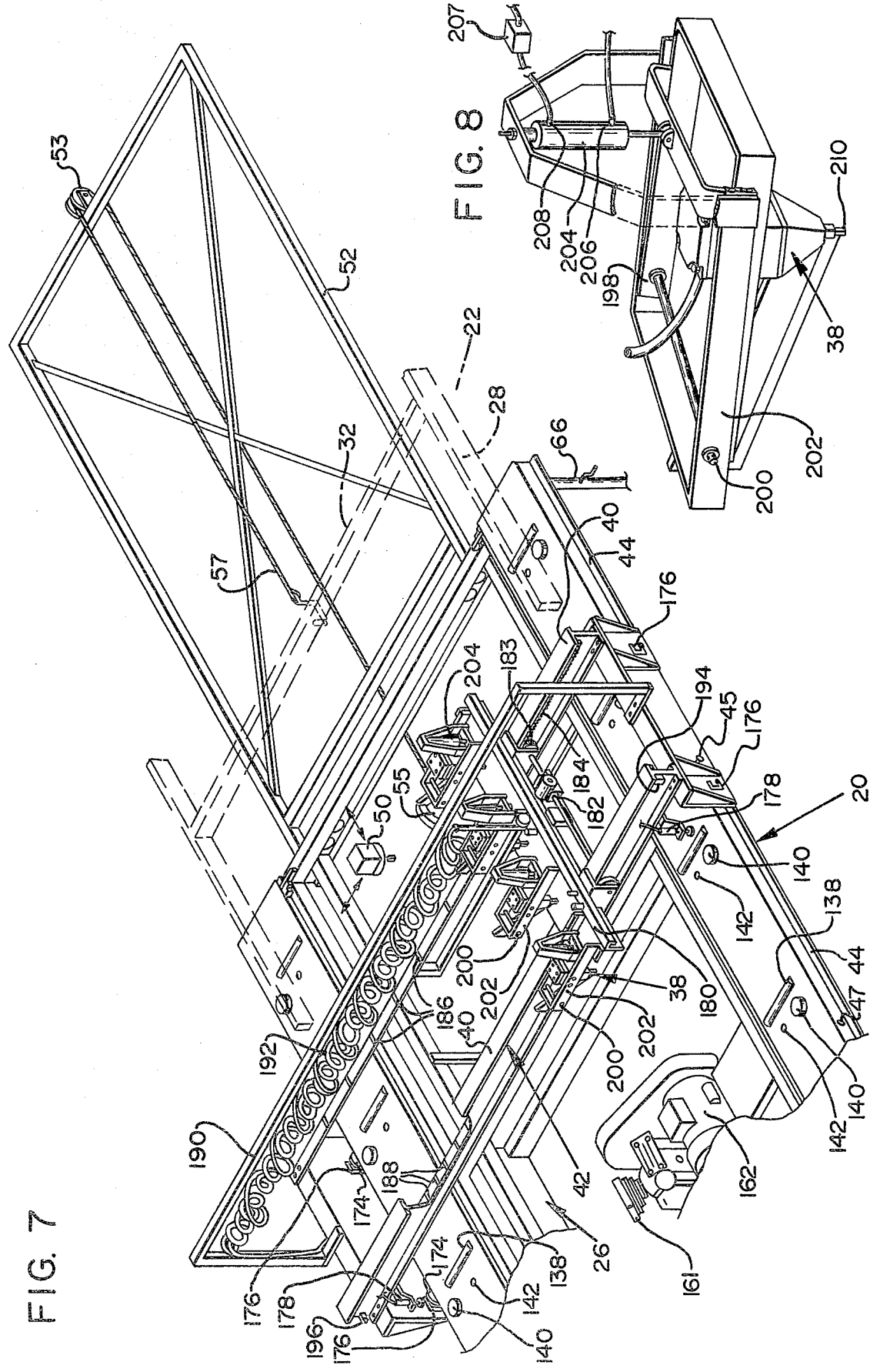

PORTABLE APPARATUS FOR ASSEMBLING FRAME STRUCTURES

BACKGROUND OF THE INVENTION

The present invention relates to a portable automatic apparatus for assembling frame structures from standard raw materials, and particularly to portable apparatus for constructing stud frame walls.

In the building construction industry the construction of stud frame walls, that is, the "framing" of a building, is typically a highly labor intensive activity and is therefore very expensive. Such stud frame walls are conventionally made by fastening a plurality of elongate wooden studs in vertical orientation and parallel to one another at predetermined intervals longitudinally between and perpendicular to a pair of elongate horizontally-disposed wooden plate members. The frame thus assembled and fastened together, if for an outside wall, is then covered on at least one side by sheathing, usually plywood sheets which are nailed to the frame. Ordinarily, the apertures for doors, windows, and the like are formed by precutting the parts of the wall frame prior to assembly.

These steps ordinarily require the efforts of a number of individual laborers at the building site and are performed at different times. It has been found, however, that the expense of the framing can be considerably reduced by applying mass production techniques to produce prefabricated walls which may be erected at the building site in partially finished form and that the cost can be further reduced and the quality increased by the use of automatic machinery to produce the walls.

In the past, prefabricated wall sections have commonly been manufactured at a location remote from the site of the building in which they are to be incorporated. Remote construction of walls, however, presents risks of damage in handling and transit to the construction site, which may require expensive on-site repairs. Additionally, transportation of such prefabricated sections creates only low-density loading of trucks and the like carrying such wall sections. These consequences of remote prefabrication lead to cost inefficiency of construction and point to the desirability of on-site automatic wall section fabrication.

Several apparatus have previously been invented which attempt to accomplish effectively the results of automatically, or semi-automatically, manufacturing prefabricated wall frames. For example, Hurn, et al, U.S. Pat. No. 3,564,702 discloses a type of apparatus for assembling part of a wall frame, but it is quite complex and does not show any specific mechanism for feeding those parts to the assembly apparatus or for completing the wall by adding sheathing and cutting holes for windows, doors, or conduits. Kellner, et al, U.S. Pat. No. 3,851,384 also shows an apparatus for manufacturing a prefabricated building wall, but is even more complex, requiring a very complicated mechanism for assembling the parts of the wall. Similarly, Bamford, Sr., U.S. Pat. No. 2,574,163 discloses an apparatus for assembling a building wall, but it utilizes complex moving mechanisms for distributing the parts of a wall over an assembly table, and requires that some of those parts be individually prefabricated. Jureit, et al, U.S. Pat. No. 3,685,129 and Carroll, U.S. Pat. No. 3,399,445 also disclose apparatus of this general type.

Schultz U.S. Pat. No. 4,039,112 discloses apparatus for construction of frame structures in which a reciprocating mechanism selects individual studs, places them individually between a pair of plate members, and automatically nails the studs in place. Provision is made for attaching sheathing material and for cutting away portions of the wall section to form apertures for doors, windows, and the like. The apparatus disclosed by Schultz, however, is neither portable nor adjustable for construction of walls of different heights or from different sizes of lumber.

There remains, therefore, a need for an improved and more efficient highway-transportable apparatus operable with normally available power to quickly and accurately build sheathed wall sections of various heights and thicknesses at the site of building construction.

SUMMARY OF THE INVENTION

The present invention satisfies the aforementioned need for a more effective and efficient portable apparatus for automatically constructing stud frame building walls by providing a unique sequence of assembly steps which may be implemented at the site of the building by a novel, accurate, and versatile portable assembly apparatus. It is therefore a principal objective of the present invention to provide a novel and improved portable apparatus for rapidly, economically and accurately constructing prefabricated frame structures such as building walls utilizing a minimum of human labor.

It is another objective of the present invention to provide such a portable construction apparatus capable of constructing prefabricated sheathed building stud walls having apertures for doors, windows, and the like.

It is a further objective of the present invention to provide such an apparatus whereby supplies of standard sized wall frame materials may be utilized as input material with a minimum of individual part prefabrication, and wherein the complexity of construction mechanism is minimized while the versatility necessary to construct particular features in a given wall is provided.

It is yet a further objective of the present invention to provide such an apparatus which may be utilized to construct prefabricated sheathed stud walls of materials of various preselected dimensions. In the present invention, wall frame studs precut to a standard length are automatically fed serially from a stack into spaced positions extending transversely between a pair of parallel wall frame plates. As each stud is placed between the plates, it is automatically nailed thereto, and the completed portion of the wall is immediately subjected to further processing to expedite construction. Next, when a sufficient area of the wall frame has been completed, sheathing material is placed into proper position and nailed to the edges of the wall frame members.

The novel apparatus for implementing the aforementioned frame wall construction utilizes a unique reciprocating mechanism which serially removes the wall frame studs from a stack, places each stud in a transverse position between the wall frame plates, and, after each stud has been automatically nailed to the plates, moves the completed portion of the frame down an assembly support structure a predetermined incremental distance for further processing. After each incremental advancement of the frame, a further stud is selected, positioned and nailed, and the cycle is automatically repeated. All of the foregoing is accomplished with all of the wall frame members horizontally disposed, so that sheets of sheathing may be easily positioned on the wall frame and thereafter nailed in place by a semi-automatic nailer mechanism.

The principal elements of the reciprocating mechanism are a reciprocating spacer table having upright brackets for engaging nailed studs, which eliminates the need for a complicated continuous-conveyor type drive, and a stud selector mechanism which removes each stud serially from the stack and positively positions the stud for nailing between the wall plate members. The stud-selector mechanism comprises a pair of stud-selecting plates each having a stud-carrying recess. The stud-selecting plates rotate reciprocally between a raised stud-receiving position, in which the bottom stud is received in the stud-receiving recesses, and a lowered stud-fastening position in which the selected stud is held between the wall plate members and may be fastened thereto by the nailer mechanism. The apparatus is adjustable for use with studs of different widths and thicknesses, such as 2"×4", 2"×6", or 3"×4", and of different lengths, and is also adjustable for placement of studs at different intervals along the length of the plate members.

A semi-automatic sheathing-nailing apparatus comprises a plurality of nailer guns or the like mounted on a transport unit which moves the nailer guns along the wall sections, nailing sheathing to the studs and plates at predetermined intervals. A unique suspension system supports each nailer gun and causes it to operate at the appropriate time.

A power-driven router or saw, capable of being moved into a variety of positions, is provided for cutting apertures of predetermined size and shape in the wall after the studs have been nailed and after sheathing material has been attached to the frame.

The aforementioned apparatus is mounted on a wheeled frame which includes stabilizing jacks, and parts of the mechanism either are detachable or may be folded to a more compact configuration, reducing the overall size of the automatic frame assembly apparatus of the invention mechanism to permit legal highway transport. An electrically-powered hydraulic pump and reservoir unit are mounted on the wheeled frame, as are an electrically-driven air compressor and a compressed air flask.

An electric winch mounted on the frame may be used in conjunction with a portable slideway attachment to move completed wall frame sections from the rear, or discharge, end of the apparatus directly to the floor of a building being constructed.

This combination of mechanisms and steps enables pieces of standard size raw materials, i.e. studs, plate members, and sheathing, to be used in assembling a frame, without being individually precut to different sizes for different specific purposes and without being placed in a predetermined order for assembly. The resultant system greatly speeds the process of frame wall construction, resulting in much lower labor costs and rendering the overall assembly process extremely economical.

It is an important advantage of the present invention that it reduces costs of construction of frame buildings by reducing the amount of labor.

It is another advantage that the present invention reduces the cost of transportation of materials for a frame building, yet permits use of the techniques of prefabricated building construction, since materials may be transported to the construction site in a more dense form than if the prefabrication were done at a distant location.

The foregoing and other objectives, features, and advantages of the present invention will be more readily understood upon consideration of the following detailed description of the invention taken in conjunction with the accompanying drawings.

BRIEF DESCRIPTION OF THE DRAWINGS

FIG. 7 is a pictorial view, at an enlarged scale, of the rear portion, including an exemplary slideway attachment, of the apparatus of FIG. 1, as indicated by the bracket 7 of FIG. 1.

FIG. 8 is a detailed view, at an enlarged scale, of the suspension system for one of the nailers of the sheathing fastener of the apparatus of FIG. 1.

DETAILED DESCRIPTION OF THE INVENTION

Figure 1:
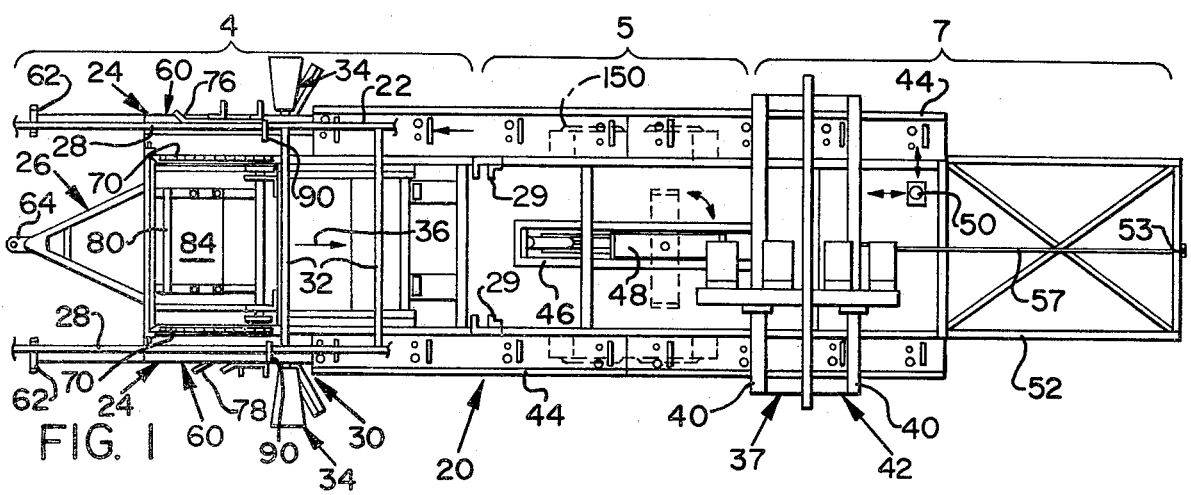
FIG. 1 is a top view of an exemplary portable apparatus for assembling frame structures which is an embodiment of the present invention.
Figure 2:
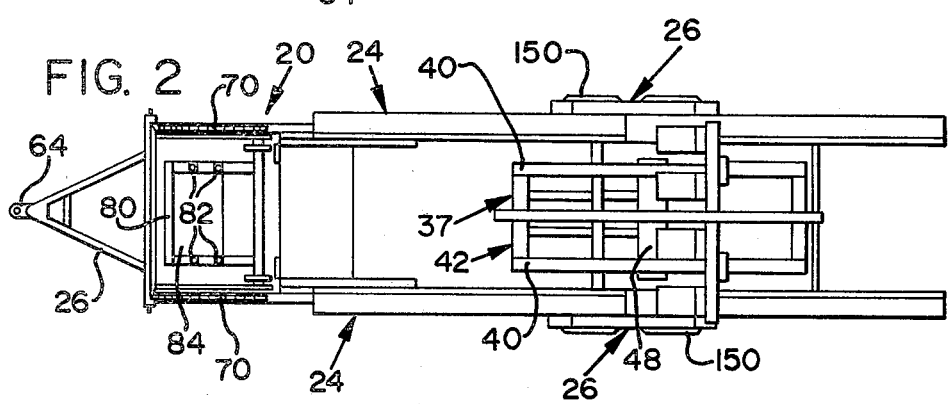
FIG. 2 is a top view of the portable apparatus shown in FIG. 1, configured for highway transportation.

Referring first to FIGS. 1 and 2, the present invention is shown embodied in a portable automatic frame assembly apparatus 20 which assembles lumber of standard dimensions into a building wall frame 22, applies sheathing material to the frame, and cuts holes in the wall for apertures such as doors, windows, and the like. In the frame assembly apparatus 20, construction of a wall takes place by assembling the raw materials and fastening them to each other in a horizontal position on an elongate support 24.

The elongate support 24 is carried on a wheeled supporting structure such as the trailer 26, so that the apparatus 20 may easily be transported by highway from one building construction site to another.

The wall frame plates 28, which will be the top and bottom horizontal pieces of the wall frame when the wall is erected, are fed longitudinally onto the front of the elongate support 24 at opposite sides thereof until their ends reach a fastening station 30. There a frame stud 32 of a preselected size is placed automatically to extend transversely between and perpendicular to the plates 28, and is nailed thereto by automatic stud-nailing assemblies 34, one of which is located on each side of the support 24. Each stud-nailing assembly 34 preferably has a pair of nailers 35 mounted so as to drive a pair of nails through each plate 28 and into the ends of the stud 32.

Thereafter, the plates 28 and nailed stud 32 are moved toward the rear of the trailer along the support 24, as shown by the arrow 36, a predetermined distance corresponding to the desired stud spacing of the wall frame 22, and another stud 32 is placed between the plates 28 and nailed thereto at the fastening station 30. This process is repeated until a complete wall frame 22 has been assembled and nailed together. For framing around openings for doors, windows, and the like, additional studs are nailed as required between the regularly spaced studs.

After a completed portion of the wall frame 22 passes from the fastening station 30, it is stopped over the wall frame squaring devices 29 where adjustable wall frame squaring forks 31 (FIG. 6) are extended upward to ensure that the studs 32 are perpendicular to the plates 28 and hold them in that configuration. Pieces of standard sized sheathing material are then laid individually by hand upon the top of the frame in edge-to-edge abutment. A semi-automatic sheathing fastener unit 37 has multiple (preferably four) automatic fastener guns such as the overhead nailer guns 38 which are arranged abreast, longitudinally of the support 24, and are drivably mounted on transverse tracks 40 of a carriage 42. The carriage 42 is movable on rails 44 located along the exterior edges of the support 24 so as to be aligned properly with the completed portion of the wall frame 22. Pins 45 are spring biased to engage holes 47 to retain the carriage 42 properly aligned with a section of a wall frame 22 while sheathing is nailed in place. This allows the nailer guns 38 to be advanced along the studs 32 transversely to the length of the support 24, nailing the sheathing to the studs 32 and plates 28.

In addition, a router or saw 50, adapted for movement into a variety of positions, is provided for cutting openings in the wall frame 22 and sheets of sheathing, for placement of windows, doors, and the like, either before or after the sheathing has been attached. Finally, a slideway 52, which includes a pulley 53, is attached at the rear of the elongate support 24 and permits use of a winch 55 and a hook-equipped cable 57 to slide completed wall frames 22 from the apparatus 20 to a desired location for use.

Figure 3:
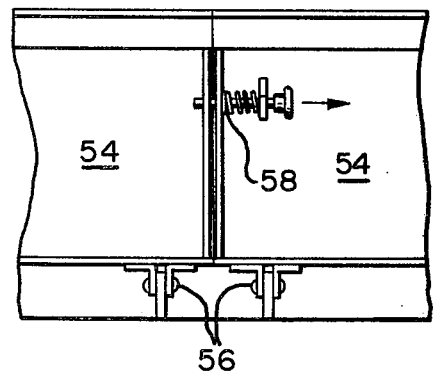
FIG. 3 is a detail, at an enlarged scale, of a portion of the folding elongate trackway of the apparatus shown in FIG. 1, showing the latch and hinge assemblies which permit folding for transport.
Figure 4:
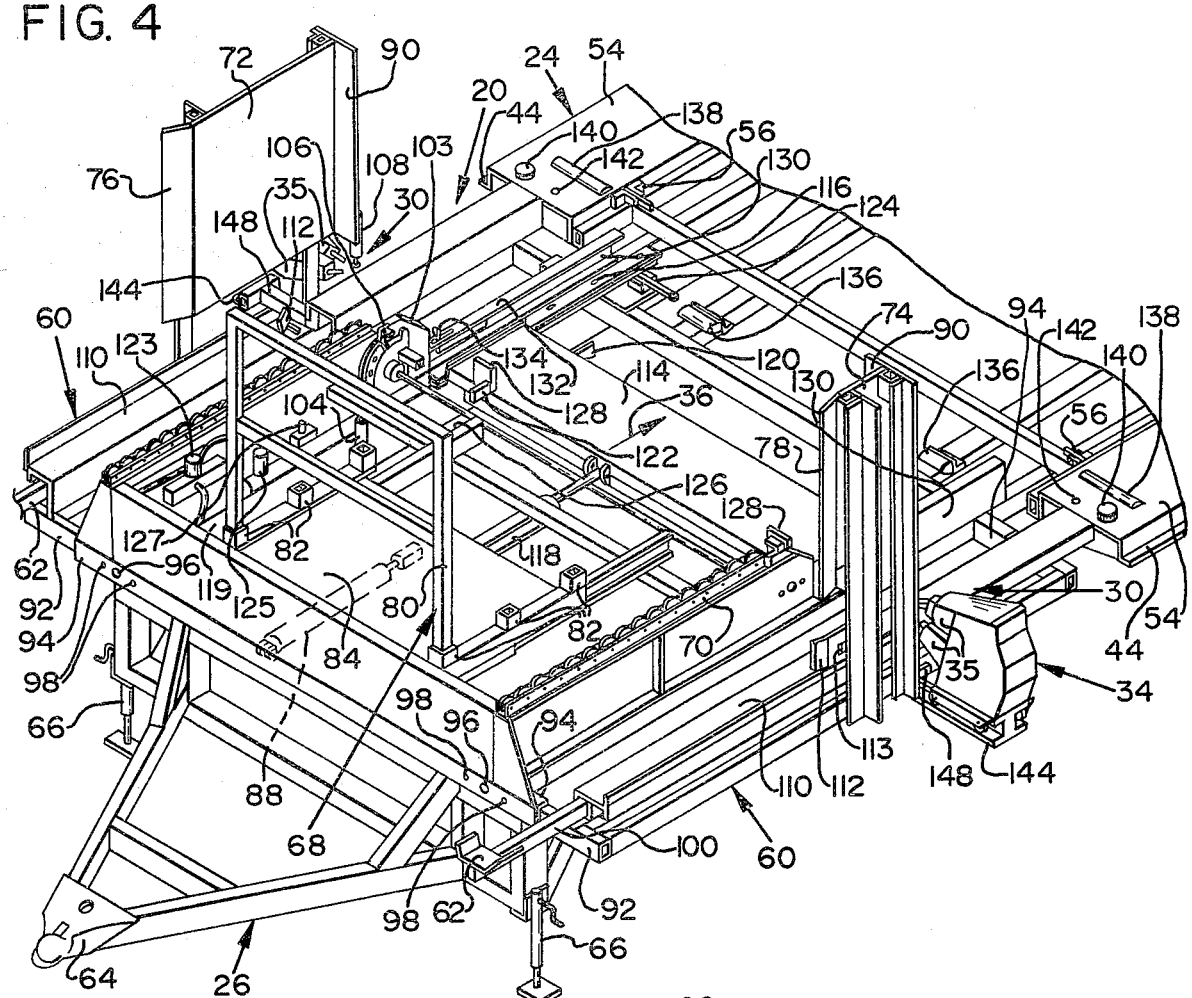
FIG. 4 is a pictorial view, at an enlarged scale, of the front portion of the apparatus shown in FIG. 1, as indicated by bracket 4 of FIG. 1.

To allow the apparatus 20 to be transported on highways in compliance with legal vehicle width limitations, yet be capable of assembling wall frames of desired height, the elongate support 24 has hinged rear trackway sections 54, which are attached by hinges 56 and interconnected by latches 58 (FIG. 3). There are also laterally extendible forward sections 60 and forward plate support extensions 62.

The apparatus 20 is placed in a transport configuration by removing the stud-nailing assemblies 34 from the fastening station 30 and placing the sheathing nailer carriage 42 in a stowed position shown in FIG. 2. This is accomplished by moving the sheathing fastener unit 37 forward along the rails 44 to a position above the lift 46. A cradle 48 raises the carriage 42 clear of the rails 44, and the cradle 48 and carriage 42 may then be rotated 90° to a position above the trailer 26. The carriage 42 is then lowered by the lift 46 and may be steadied, for example by corner guides (not shown), to prevent shifting during transport.

The hinged trackway sections 54 are raised to the position illustrated in FIG. 2, as permitted by the hinges 56 and latches 58, while the extendible forward sections 60 are slid inwardly, and the forward plate support extensions 62 are slid rearwardly within the extendible forward sections 60. The slideway 52 may be removed from the rear of the elongate support 24 for storage (not shown) atop the apparatus 20. The automatic frame assembly apparatus 20 is thus made small enough for legal transport on the highways yet in extensible to a width sufficient to permit assembly of standard height walls.

Referring now to FIGS. 4 through 8, the trailer 26 is seen to comprise a trailer hitch 64 (FIG. 4) and a pair of jacks 66 at each end, used to level and firmly support the trailer 26 in position at a construction site.

A stud stack holder 68, located at the front end of the apparatus 20, is used to hold a stack of studs 32 in readiness for placement between a pair of plates 28 for assembly into a wall frame 22. The stud stack holder 68 comprises a pair of roller-equipped rails 70. The rails 70 are higher than the extendible forward sections 60 to hold the supply of studs 32 where they do not interfere with the plates 28. Right and left side walls 72 and 74 have flared edges 76 and 78 to align the ends of the studs 32 as the stack of studs is moved rearward. A stanchion 80 may be fitted into any of three pairs of sockets 82 of a table 84 which may be moved by a pneumatic cylinder and piston assembly 88 to move the stack of studs 32 rearwardly toward a pair of vertical retaining members 90, which align the studs 32 vertically to permit selection and transfer to the fastening station 30.

The extendible forward sections 60 may be seen to include lateral support members 92 which slide laterally with respect to the trailer 26 within lateral support tubes 94. The support members 90 are held at a desired position of lateral extension by pins 96 which fit in corresponding holes 98 in the lateral support tubes 94. Similarly, the forward plate support extensions 62 slide in tubular support 100.

The stud-selector mechanism in the preferred embodiment comprises a pair of stud-selecting plates 102 and 103 located between the rearward portions of the rails 70 and mounted for reciprocal rotation about an axis which extends laterally of the trailer 26. A double acting hydraulic cylinder and piston assembly 104 is connected to the stud-selecting plate 103 to reciprocatingly rotate both of the stud-selecting plates 102 and 103, as will be explained in greater detail below. The stud-selecting plates 102 and 103 each include a stud-receiving recess 106 of adjustable size used to transfer a stud 32 from the stack holder 68 to the stud-fastening station 30.

A stud/plate hold-down unit 108, comprising a pneumatic cylinder and piston assembly and a pressure plate connected to the piston, is located on each side of the apparatus, attached to the respective retaining member 90 where the pressure plate can exert downward pressure on both a plate 28 and a stud 32 in the stud-fastening station 30. Right and left elongate plate-support members 110 are provided to support the plates 28 which form the top and bottom of each completed wall frame 22. Diagonal guides 112 are provided on each plate-support member 110 to align each plate 28 properly for assembly into a wall frame 22. A hydraulic plate spreader cylinder and piston assembly 113 is located on each side of the apparatus, near the diagonal guides 112.

A hydraulic pump and pressure tank unit 119 is located at the right-hand front corner of the trailer 26. A magnetic timer 125 and two three-position four-way solenoid operated valves 123 and 127 are also located nearby the hydraulic pump and pressure tank unit 119. The solenoid-operated valve 123 controls a hydraulic cylinder and piston assembly 118, while the solenoid-operated valve 127 controls the hydraulic cylinder and piston assemblies 104.

Rearward from the stack holder 68, a spacer table 114 is supported for forward and rearward reciprocal motion in slide bearing gibs 116. The hydraulic cylinder and piston assembly 118 is connected between the undercarriage of the trailer 26 and the spacer table 114 to move the spacer table 114 reciprocatingly forward and rearward. Switch operating tabs 120 and 122, mounted on the spacer table 114, operate switches 124 and 126 respectively to control movement of the spacer table 114 and other operation of the apparatus 20 as will be explained in greater detail below.

A pair of stud pusher brackets 128 extend vertically from the forward edge of the spacer table 114 and extend above the level of the plate support members 110. The brackets 128 engage the forward side of a stud 32 which has been nailed between a pair of plates 28, to push the wall frame 22 rearward during assembly. A pair of parallel rails 130 extend rearwardly from the rails 70, with their top surfaces 132 at the same height as the tops of the elongate plate support members 110.

A finger 134 is mounted in each rail 130 for reciprocal rotation by a pneumatic cylinder and piston assembly 135, between a lowered position below the top surface 132 of the rail 130, and a raised position in which the fingers 134 extend above the top surface 132. When raised, the fingers 134 hold a stud 32 in the stud-fastening station 30, while it is being nailed to the plate members 28. A pair of rubber bumpers 136 limit rearward movement of the spacer table 114 as it completes its rearward stroke.

Each trackway section 54 has a plurality of horizontal rollers 138 which support the plates 28 as a wall frame 22 is moved rearwardly during assembly. A plurality of edge rollers 140, also mounted on the trackway sections 54, guide the frame 22 to keep it moving straight toward the rear of the apparatus 20. For building wall frames 22 of different heights, the separation between the edge rollers 140 of the two sides of the apparatus may be varied by mounting the edge rollers 140 in appropriate ones of a plurality of sets of locator holes 142.

The stud-nailer assemblies 34 comprise small wheeled stud-nailer carriages 144 which permit a double action pneumatic cylinder and piston assembly 146 (FIG. 10) to move each stud-nailer carriage 144 laterally toward and away from the respective fastening station 30. A clamping screw 149 holds each stud-nailer assembly 34 in a socket 148 connected to one of the laterally extendible forward sections 60 of the apparatus 20. The pair of nailers 35 are adjustably mounted on the carriage 144, permitting proper placement of nails in plates of differing sizes. Each nailer 35 includes a trigger 150 which actuates the nailer when depressed by contact with an object.

Figure 5:
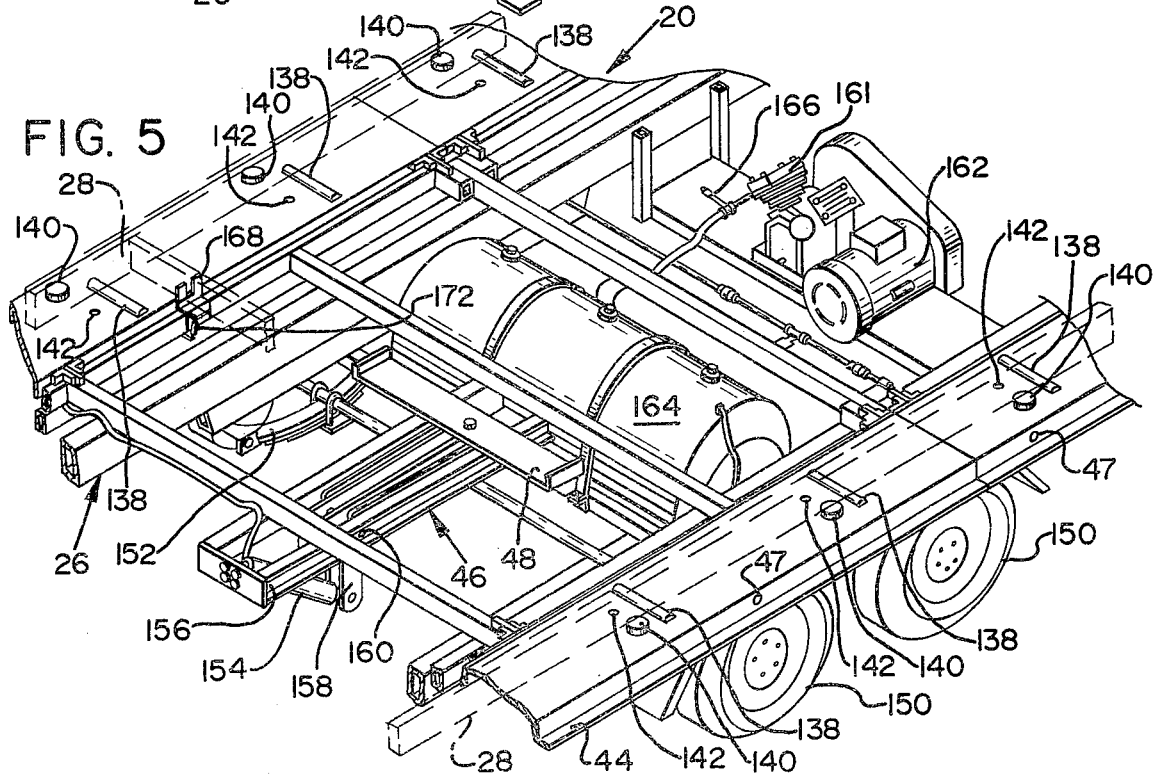
FIG. 5 is a pictorial view, at an enlarged scale, of the central portion of the apparatus shown in FIG. 1, as indicated by the bracket 5 of FIG. 1.

Referring now to FIG. 5, it may be seen that the trailer 26 comprises a plurality of wheels 151 supporting the trailer. Springs 152 provide a suitable suspension for highway transport of the apparatus 20.

The sheathing nailer lift 46 may be seen to comprise a hydraulic cylinder and piston assembly 154, mounted within a "U"-shaped frame 156. An "L"-shaped lever 158 supports the cradle 48. The lever 158 is pivotably supported by a pivot connection 160, so that extension of the cylinder and piston assembly 154 causes the cradle 48 to rise relative to the trailer 26.

A compressor 161, powered preferably by an electric motor 162 which may be operated on electrical power normally available at the construction site, compresses air, which is then stored in an air flask 164, whose capacity in a preferred embodiment of the invention is 120 gallons. A relief valve 166 protects against excessive air pressure, and the motor 162 is controlled by a pressure-operated switch to maintain the pressure within the air flask 164 within about 10% of its rated pressure of 160 pounds per square inch. The air pressure is lowered to about 100 psig by a reducing valve (not shown) before the air is further distributed. Air at a known pressure is thus made available for operation of the several pneumatic cylinder and piston assemblies and the pneumatically operated fasteners.

Figure 6:
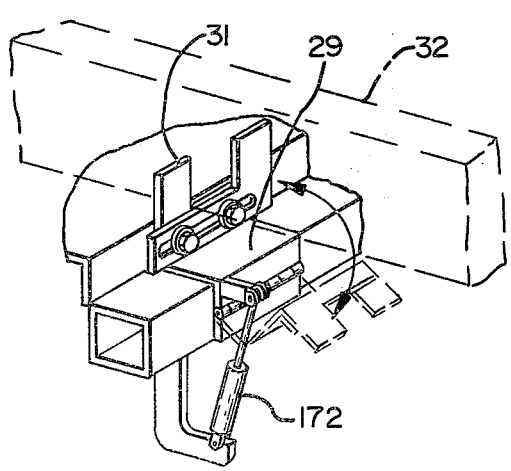
FIG. 6 is a detailed view, at an enlarged scale, of an exemplary frame squaring mechanism which may be used in the apparatus of FIG. 1.

The frame squaring device 29 mounted on each side of the apparatus includes a fork 31 mounted on a hinge 170 and may be movable, for example, by means of a pneumatic cylinder and piston assembly 172 controlled by manually operated valves (not shown) as may be seen in greater detail in FIG. 6. The forks 31 are raised by the cylinder and piston assemblies 172 to fit around each end of one stud of a completed or partially completed frame 22. This squares the frame, making the studs 32 perpendicular to the plates 28, before a sheet of sheathing material is fastened to the frame 22.

Referring now to FIG. 7, showing the rearward portion of the apparatus 20 of the present invention, as indicated by the bracket 7 in FIG. 1, the sheathing fastener unit 37 may be seen to comprise a carriage 42 which rides on rollers 174 permitting the carriage 42 to move longitudinally of the apparatus 20 along the tracks 44. Pins 45, which operate similarly to pins 58 (FIG. 3), may be engaged in holes 47 to properly locate the carriage 42 for nailing into the studs 32 and plates 28 of a frame 22 engaged by the frame squaring devices 168. The rollers 174 are secured to the carriage 42 by bolts which pass through C-shaped slots 176 allowing the carriage 42 to be raised or lowered with respect to the level of the trackway sections 54, to accommodate wall frames 22 made from studs and plates of various sizes of lumber. A pneumatic hold-down cylinder and piston assembly 178 is mounted at each corner of the carriage 42 to hold sheathing material firmly in place on to of a section of an assembled wall frame 22 as the sheathing is nailed in place by the nailers 38.

A nailer transport unit 180, moved by motor 182 through a drive pinion 183 which engages a rack 184, carries the four nailer guns 38 along the tracks 40 to automatically place nails at predetermined positions. A plurality of cams 186 are located along a flange of one of the rails 40 to operate a valve periodically during movement of the transport unit 180 along the rails 40 to cause each of the center pair of the nailer guns 38 to discharge a nail into the sheathing and underlying stud 32. A plurality of similar cams 188 at a different, preferably closer, spacing similarly operate the nailer guns 38 on each end of the transport unit 180. A cable support member 190 and slides 192 attached thereto support the hoses and electrical cables which supply electricity and compressed air to the nailer guns 38, motor 182, and control devices for the nailer guns 38. Switches are included in a control panel (not shown) to individually enable and disable the nailer guns 38. Limit switches 194 and 196 limit the motion of the transport unit 180 in each direction.

Referring now to FIG. 8, it may be seen that each nailer gun 38 is attached to a pivotally mounted frame 198 which is attached by a pivotal connection 200 to a nail gun support 202. The nailer guns 38 are adjustably mounted on slotted plates which are part of the frames 198, to allow tilting and horizontal or vertical adjustment. The position of each nailer gun 38 can thus be adjusted to properly place nails through sheathing of various thicknesses into the studs 32 and plates 28.

A double acting pneumatic cylinder and piston assembly 204 is normally provided with air at about 25 psig, via its bottom air inlet 206, while each impulse initiated by one of the cams 186 or 188 supplies high pressure air to an upper air inlet 208, overcoming the air pressure in the lower end of the cylinder and forcing the respective nailer 38 down toward sheathing or other material below. If a nail gun trigger 210 contacts material, it causes the nailer gun 38 to place a nail. As the respective follower goes off the cam 186 or 188, the respective valve dumps pressure from the upper end of the cylinder 204, allowing the 25 psig air to raise the associated nailer gun 38. A solenoid-operated valve 207 connected with each cylinder 204 permits exclusion of high pressure air, to selectively disable a nailer gun 38. Lifting any nailer gun from its normal position opens a mechanically operated valve, dumping the air pressure from the nailer gun 38 and thus rendering the nailer gun safe.

Figure 9:
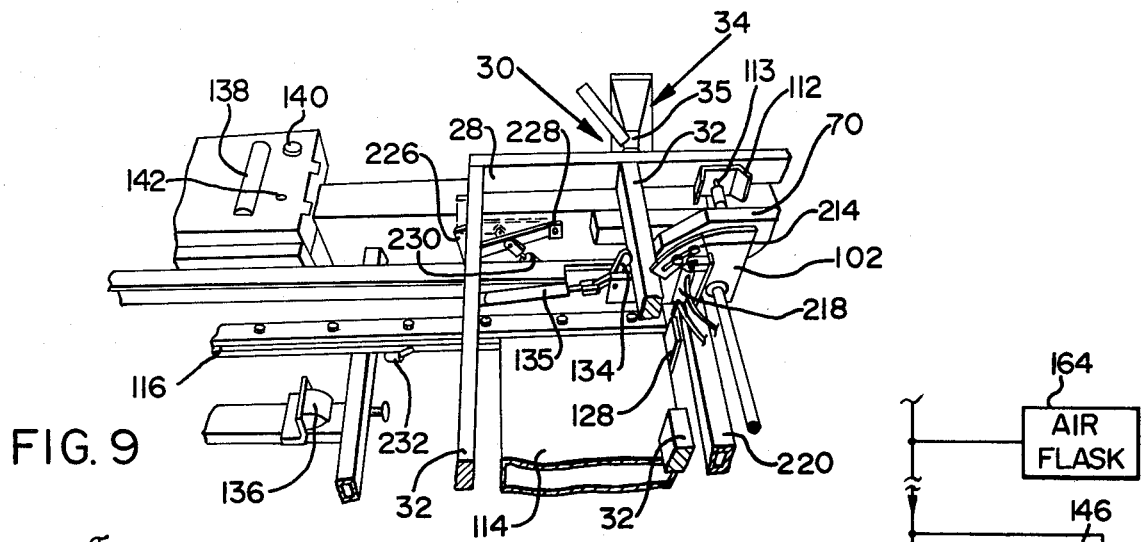
FIG. 9 is a pictorial side view, at an enlarged scale, of a detail of the left side of the stud-fastening station of the apparatus of FIG. 1.
Figure 10:
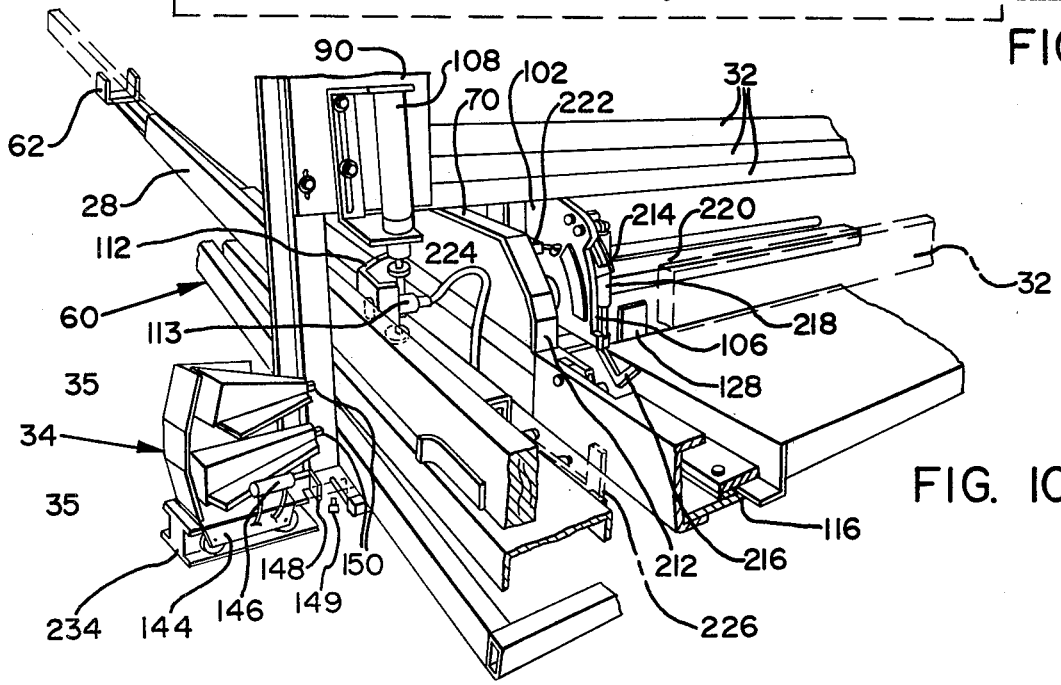
FIG. 10 is a pictorial view, at an enlarged scale, of a detail of the stud-fastening station of the apparatus of FIG. 1, as seen from a position rearward and to the left of the stud-fastening station.

FIGS. 9 and 10 show the left hand side of the stud-selecting mechanism and fastening station 30 of the invention, with the stud-selecting plate 102 in the downward position. At this point in the wall frame assembly cycle, the fingers 134 are in their raised position, holding a stud 32 tightly adjacent to the rearward faces 212 of the rails 70.

A slotted adjustment plate 214 is adjustably bolted to the stud-selecting plates 102 and 103 to adjust the size of the recesses 106 to the width of the studs 32 being used. With the stud-selecting plates 102 and 103 in the lowered position, the stud-selector operating cylinder and piston assembly 104 (FIG. 4 and FIGS. 11-13) is extended. One of a pair of stud holder dogs 216, operated by a pneumatic cylinder and piston assembly 218, is pivotally attached to each end of a crossbar 220 which interconnects the left and right stud-selecting plates 102 and 103, providing simultaneous rotation.

Operation of the stud holder dog operating cylinder and piston assembly 218 is controlled by means of a valve 222 operated by a raised cam plate 224 attached to the side of the stud-selecting plate 102 on the left side of the frame assembly apparatus 20. When the cam 224 raises the cam follower, operating the valve 222, the cylinder and piston assembly 218 raises the stud holder dog 216. The valve 222 also directs air to the plate spreader assemblies 113 (FIGS. 4 and 10) at the same time.

One of a pair of catcher hooks 226 is located on each side of the apparatus, (see also FIGS. 11-13) attached to the laterally extendible forward section 60 by a pivot connection 228. The catcher hooks 226 may be raised by a pneumatic cylinder and piston assembly 230. A valve 232, situated along the slide bearing gibs 116 on the left side of the apparatus, is operated by the spacer table 114 during the rearward portion of its cycle, and causes the cylinder and piston assemblies 230 to extend, raising the catcher hooks 226 to catch the most recently nailed stud 32 and thus positively stop the rearward motion of a wall frame 22.

Referring now particularly to FIG. 10, each stud-nailing assembly 34 may be seen to comprise a track 234 which guides the roller-supported stud nailer carriage 144. The double action pneumatic cylinder and piston assembly 146 is interconnected between mounting points on the track 234 and the carriage 144 to move the carriage 144 toward and away from a plate 28 and stud 32 in the nailing station 30.

Figure 11:
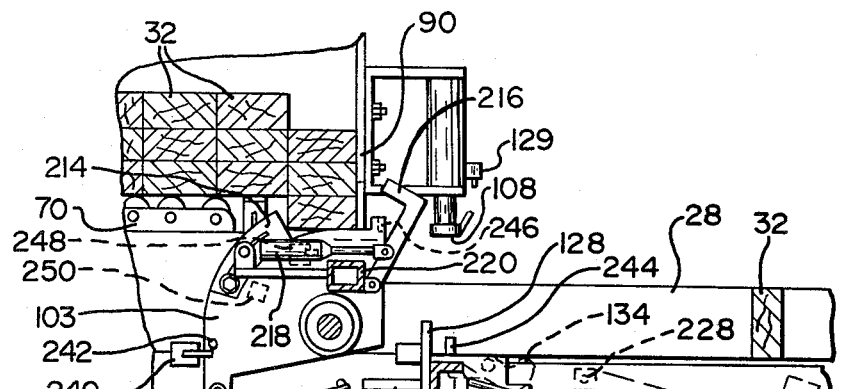
FIG. 11 is a side view, at an enlarged scale, of a detail of the right-hand side of the stud-selector mechanism of the apparatus shown in FIG. 1, showing the positions of components during selection of a stud from the stack.
Figure 12:
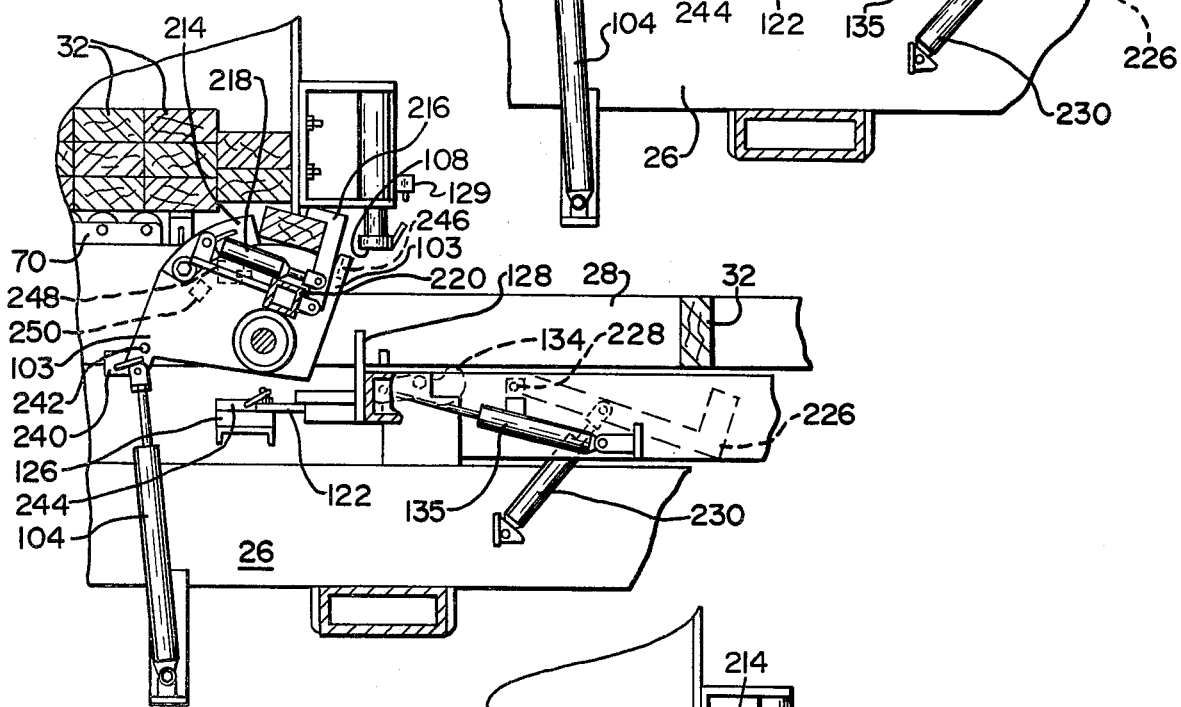
FIG. 12 is a side view, at an enlarged scale, of a detail of the right-hand side of the stud-selector mechanism of the apparatus shown in FIG. 1, showing the positions of the components during movement of a stud toward the stud-fastening station.
Figure 13:
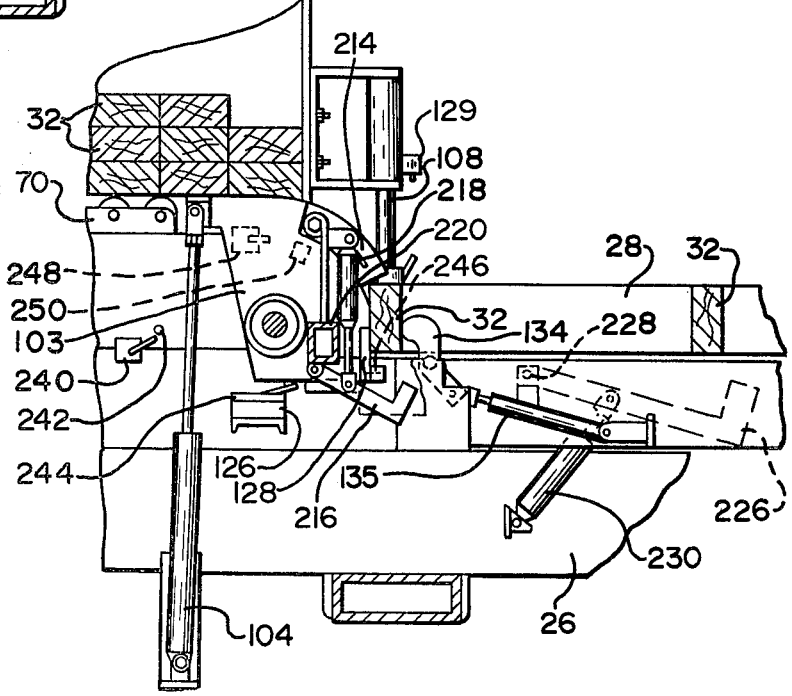
FIG. 13 is a side view, at an enlarged scale, of a detail of the right-hand side of the stud-selector mechanism of the apparatus shown in FIG. 1, showing the positions of the components when a stud is in the stud-fastening station.

Referring now to FIGS. 11 through 13, it may be seen that additional switches are operated by the right-hand stud-selecting plate 103. A stud-selector upper limit switch 240 is operated by a pin 242 extending from the stud-selector plate 103, and controls solenoid-operated valve 27 to stop retraction of the stud-selector cylinder and piston assemblies 104. A stud-selector lower limit switch 244 is operated by a switch operating tab 246 as the right-hand stud-selector plate 103 approaches its fully down position, and causes solenoid-operated valve 127 to stop extension of the stud-selector cylinder and piston assembly 104.

A nailer sequence initiating valve 248 is attached to the left side of the right-hand rail 40, adjacent to the right-hand stud-selector plate 103. A cam 250 protruding from the right side of the right-hand stud-selecting plate 103 operates the nailer sequence initiating valve 248 as the stud-selecting plate 103 rotates downward, a hinge in the cam follower connected to the nailer sequence initiating valve 248 allowing the stud-selecting plate 103 and cam 250 to move in the opposite direction without operating the valve 248.

Figure 14:
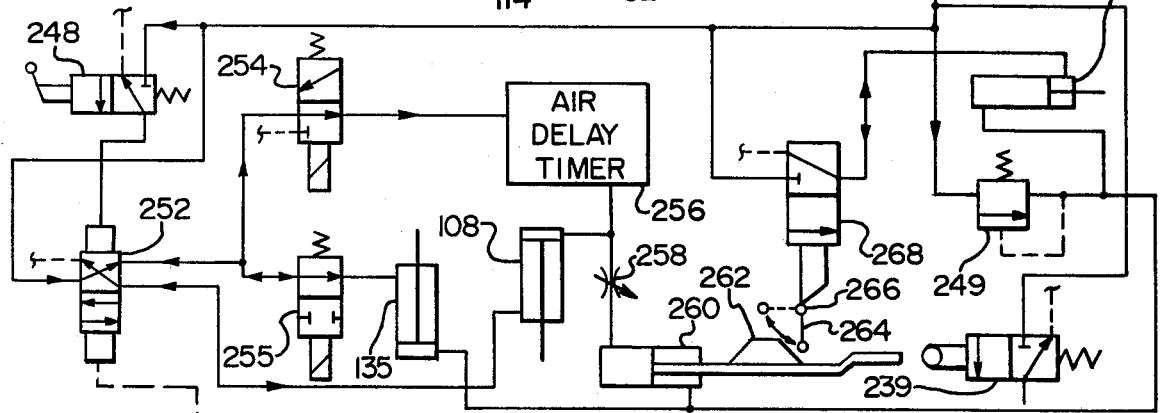
FIG. 14 is a diagrammatic representation of exemplary apparatus for controlling stud-nailing assemblies of the apparatus.

Referring to FIG. 14, the stud nailers 34 are seen to be controlled by a network of mechanically and electrically operated valves controlling the compressed air supplied from the air flask 164. While the majority of the work is done by the 100 psig compressed air, a pressure reducing valve 249 also provides air at about 25 psig. The pneumatic valve 248 initiates the stud nailer operational sequence. A pilot-operated air control valve 252 controls distribution of air from the air flask 164 to operate the various elements of the stud-nailing mechanism. In one position, valve 252 supplies air pressure to retract the finger-operating cylinder and piston assemblies 135, raising the fingers 134, and also supplies air pressure to the solenoid-operated valve 254. In its other position control valve 252 retracts cylinder and piston assembly 108, allowing cylinder and piston assembly 135 to extend by exhausting air previously directed to solenoid-operated valves 254 and 255.

A normally open solenoid-operated valve 255 is located in the air line between the control valve 252 and the cylinder and piston assemblies 135, and may be closed by a switch located at a control panel (not shown).

The valve 254 is electrically controlled by the spacer table power control switch (not shown) and is always open if the spacer table is energized. This is a safety feature, preventing the nailers 35 from being moved should the valve 248 be accidently operated, with the machine deenergized, but while air pressure is present in the lines. The solenoid-operated air cut-off valve 254, when the solenoid is actuated, admits air pressure from the pilot-operated air control valve 252 to an air timer unit 256.

The air delay timing unit 256 may, for example, by a model 59121 mechanical air delay timer manufactured by A.P.0. of Bryon, Ohio, which delays passage of air for an adjustable period of time. The outlet side of the air delay timer 256 is connected to extend the stud/plate hold-down units 108 and to an air metering valve 258. The air metering valve 258 is adjustable to allow air to pass at a predetermined rate from the air delay timer 256 to a pneumatic cylinder and piston assembly 260 connected to move a cam 262.

A cam follower 264 rides on the cam 262, and is connected by a pivotal connection 266 to the operating lever of an air valve 268 which is biased to a normally closed condition. The cam follower 264 opens the valve 268 in response to the cam 262 as the piston and cylinder assembly 260 extends, directing air to pneumatic cylinder and piston assembly 148 and drawing the stud-nailing assembly 34 toward the plate 28 and stud 32 in the nailing station 30. The cam follower 264, however, is free to pivot as indicated in broken line in the drawing without opening the pneumatic valve 268 during the return stroke of the cam 262 as the cylinder and piston assembly 260 contracts.

As the cylinder and piston assembly 260 approaches its fully extended position it moves an air valve 239, which is biased to an exhaust position, to a transmitting position. In its transmitting position the air valve 239 pneumatically operates valve 252, which provides air to retract the stud/plate holders 108.

In an alternative embodiment of the invention, the magnetic timer 125 is connected to an actuation switch 129 located on the right stud/plate hold-down unit 108. The switch 129 is closed when the hold-down unit 108 retracts, sending an electrical signal to the solenoid-operated hydraulic valve 123. The solenoid-operated valve 123, in response, directs hydraulic fluid to extend the cylinder and piston assembly 118. Since the fingers 134 and the stud/plate hold-down units 108 retract simultaneously when the air valve 239 is opened, the switch 129 ensures that the spacer table 114 is not moved rearwardly while the fingers 134 are still raised. Additionally, the actuation switch 129 reduces cycle time for the operation of the apparatus from about 11 seconds/cycle to about 9 seconds/cycle.

Wall Frame Assembling Operational Sequence

Operation of the frame assembling portions of the apparatus 20 is initiated by energizing the hydraulic unit 119 and the air compressor 161, ensuring sufficient compressed air pressure is available in the air flask 164, and energizing the electrical control systems for the spacer table and stud-selecting mechanism. Upon being energized, the spacer table 114 (FIG. 4), powered by the hydraulic cylinder and piston assembly 118, moves rearward until the switch operating tab 120 engages the limit switch 124. The switch 124 is located so that the spacer table 114 comes into contact with the rubber bumpers 136 as the spacer table 114 completes a stroke of rearward movement which is equal to the desired spacing between consecutive studs 32 of the frame 22 being assembled. The switch 124 sends an impulse to the solenoid-operated hydraulic valve 123, which reverses the direction of the hydraulic cylinder and piston assembly 118, returning the spacer table 114 toward the front of the apparatus. The switch 124 also sends an impulse to the solenoid-operated hydraulic valve 127, which initiates the cycle of the stud-selector mechanism by valving hydraulic fluid to the hydraulic cylinder and piston assembly 104, causing it to contract and rotate the stud-selecting plates 102 and 103, moving the stud-receiving recesses 106 toward the raised position.

As the stud-selecting plates 102 and 103 rotate upward, the cam plate 224 actuates the valve 222 (FIG. 10), directing air pressure which causes the pneumatic cylinder and piston assemblies 218 to contract, raising the stud-holder dogs 216, and also causes the plate spreader pneumatic cylinder and piston assemblies 113 to extend. During this rotation of the stud-selecting plates 102 and 103, the bottom-most stud 32 in the stack nearest the retaining members 90 rests upon the arcuate edges of the stud-selecting plates 102 and 103 and the slotted adjustment plates 214.

As the stud-selecting plates 102 and 103 approach their uppermost position, the operating arm roller of the valve 222 rolls off the cam plate 224, extending the cylinder and piston assemblies 218, moving the stud-holder dogs 216 away from the recesses 106 of the stud-selecting plates 102 and 103. As the right-hand stud-selecting plate 103 (FIG. 11) approaches its uppermost position, the pin 242 engages a lever arm of the upper limit switch 240, sending an electrical impulse to the solenoid-operated valve 127, which stops the flow of hydraulic fluid to the cylinder and piston assembly 104, terminating the rotation of the stud-selector mechanism. When the stud-selecting plates 102 and 103 are in this uppermost position, the bottommost stud in the stack adjacent to the retaining members 90 drops into the recess 106 in each of the stud-selecting plates 102 and 103.

As the spacer table 114 approaches the front of the apparatus, the switch-operating tab 122 engages the limit switch 126, which sends an electrical impulse to the solenoid-operated valve 123 which then stops the contraction of the cylinder and piston assembly 118. The limit switch 126 also starts the magnetic timer 125, which measures the time during which the spacer table should remain forward during a cycle of operation of the stud-selecting and nailing sequences. The switch 126 also sends an impulse to the solenoid-operated valve 127, which initiates the downward rotation of the stud-selector mechanism.

Upon receiving an impulse from the switch 126, the solenoid-operated valve 127 sends hydraulic fluid to extend the hydraulic cylinder and piston assembly 104, moving the stud-receiving recesses 106 downward toward the nailer station 30. As the cylinder and piston assembly 104 extends, the lowermost stud 32 in the stack is pushed rearwardly and out from under the rest of the stack of studs 32 by the slotted plates 214. As the stud-selecting plates 102 and 103 rotate downward, the cam follower of the valve 222 again rides up onto the cam 224, contracting the cylinder and piston assembly 218 to close the stud holder dogs 216 around the selected stud 32 and extend the plate-spreader cylinder and piston assemblies 113. The stud-selector assembly thus brings the selected stud 32 positively downward into position adjacent to the rearward faces 212 of the rails 70 and between the slightly spread apart plates 28.

As the stud-selector plate 103 rotates downward, the cam 250 actuates the nailer sequence initiating valve 248. Valve 248 sends an impulse of air to reposition control valve 252, which initiates contraction of the cylinder and piston assemblies 135 to raise the fingers 134 to hold the selected stud 32 in position for nailing between the plates 28. The control valve 252 also sends air to the solenoid-operated air valve 254. If the solenoid-operated valve 254 is open it allows compressed air to proceed into the air delay timer 256.

During the delay period required by the air delay timer 256, as the stud-selecting plates 102 and 103 approach the lowermost position, the cam follower of the stud-holder operating valve 222 again rolls off the cam plate 224. In response, the stud-holder hooks 216 open and the plate spreader cylinder and piston assemblies 113 retract, allowing the plate members 28 to return toward the stud 32.

After a predetermined delay period during which the stud-selecting plates 102 and 103 arrive and stop in their lowered position and the fingers 134 move upward to hold the stud 32 in the nailing position, the air delay timer 256 admits air pressure to the stud/plate holddown cylinder and piston assemblies 108, which extend to hold the plates 28 and the selected stud 32 down tightly against the supports 110, The air delay timer 256 also admits air to an adjustable metering valve 258 which sends air at a predetermined rate to a pneumatic cylinder and piston assembly 260 which moves the cam 262. The cam follower 264 connected to the pneumatic valve 268 rides along the cam 262, operating the pneumatic valve 268. The valve 268 admits air to the cylinder and piston assemblies 146 on each nail gun assembly 34, retracting the piston into the cylinder to move the stud nailer carriages 144 toward the plates 28 in the nailing station 30 on each side of the apparatus.

As the stud nailer carriages 144 move the nailers 35 toward the plates 28, actuating triggers 150 on the individual nailers 35 are pushed toward each nailer 35 by the plates 28, causing each nailer 35 to place a nail. As may be seen in FIG. 10 the nailers are aligned so as to place a pair of nails through each plate member 28 into the stud 32 in the fastening station 30 so that the nails converge slightly toward one another.

As the pneumatic cylinder and piston assembly 260 continues to extend, the cam follower 264 of the valve 268 rolls off the cam 262, allowing the air valve 268 to move to the exhaust position, and allowing reduced pressure (about 25 psig) from the pressure reducing valve 249 to re-extend the cylinder and piston assemblies 146, holding the stud nailer carriages 144 normally away from the plates 28.

Continued movement of the pneumatic cylinder and piston assembly 260 to its fully extended position engages the pneumatic valve 239, which causes the plate hold-down cylinder and piston assembly 108 to contract, releasing the plates 28 and stud 32, and simultaneously causes the pneumatic cylinder and piston assembly 135 to extend, lowering the fingers 134.

Upon expiration of the preset time during which stud-selection and nailing occur, the magnetic timer 125 sends an electrical pulse to the solenoid-operated hydraulic valve 123, initiating the rearward movement of the spacer table 114 by the hydraulic cylinder and piston assembly 118.

In the alternate embodiment, when the actuation switch 129 is closed, after expiration of the preset time of the timer 125, by the retraction of the right side holddown cylinder and piston assembly 108, it causes operation of the solenoid-operated valve 123 for the same purpose. As the spacer table 114 moves rearwardly, it engages the valve 232 (FIG. 9) which causes the pneumatic cylinder and piston assembly 230 on each side of the apparatus to extend, raising the catcher hooks 226 to engage the rearward side of the just-nailed stud 32, limiting rearward movement of the frame 22. At about the same time, the switch-operating tab 120 engages the arm of the switch 124 (FIG. 4) which sends an impulse to the solenoid-operated valve 123. The solenoid-operated valve 123 redirects hydraulic fluid to the retraction side of the cylinder and piston assembly 118, reversing the direction of movement of the spacer table 114, which moves forward to initiate the next stud-selection and fastening cycle.

The above cycle may be repeated automatically until studs 32 have been nailed between a pair of plates 28 at the desired spacing along the full length of the pair of plates 28. Adjustment of stud spacing is accomplished by relocation of the switch 124, valve 232, bumpers 136, and catcher hooks 226.

Double studding, or shorter distance studding capability is provided by manually operable electric switches on a control box (not shown). These switches close valve 225, keeping fingers 134 down, close a solenoid-operated valve (not shown) between catcher valve 232 and catcher cylinder and piston assembly 230, keeping the catchers 226 down, and parallel the functions of limit switch 124, signaling for the return of the spacer table 114 and initiating another stud-selection and nailing cycle.

Successive plates 28 must be manually positioned on each support 110 as the first stud 32 of each frame 22 is selected and nailed.

As enough of a given section of frame 22 is completed to receive a sheet of sheathing material, the frame straighteners 168 are raised by the cylinder and piston assemblies 172, under manual control, to ensure that the frame 22 is properly aligned with the studs 32 perpendicular to the plates 28, before sheathing is nailed into place. With the frame straighteners 168 raised, a sheet of sheathing is manually positioned over the frame 22, after which the nailer carriage 42 is positioned appropriately along the tracks 44 where it is held in place by the pins 45 in the holes 47.

The nailer transport unit 180, moved by the motor 182, carries the four nailer guns 38 along the track 40 to automatically place nails at predetermined positions. A plurality of cams 186 located along a flange of one of the rails 40 operate a switch (not shown) periodically during movement of the transport unit 180 along the rails 40 controlling solenoid valves to cause each of the center pair of the nailer guns 38 to move downward and discharge a nail into the sheathing and underlying stud 32. A similar plurality of cams at a different, preferably closer, spacing similarly operate the nailer guns 38 on each end of the transport unit 180. Limit switches 194 and 196 limit the motion of the transport unit 180 in each direction, so that once the motor 182 is energized, the transport unit 180 moves across the entire width of a panel of sheathing, automatically nailing the sheathing to the frame 22 across the entire width of the frame 22 and then stops.

After nailing one piece of sheathing to a frame 22 the carriage 42 is moved along the rails 44 into position over the next sheet of sheathing to be nailed. The carriage 42 is again secured by pins in proper position for nailing by additional holes placed relative to the frame squaring devices 168. The next sheet of sheathing is then nailed with the transport unit 180 moving in the opposite direction along the tracks 40.

If a double-sheathed wall section is desired, the wall frame 22 may be manually inverted after the first sheathing has been applied. Thermal insulation may be placed between the studs, and sheathing may be affixed to the opposite side of the plates 28 and studs 32 by the sheathing fastener unit 37 in the same general manner previously described.

The apparatus of the invention may be used to assemble frames completely of uniform dimension studs, later cutting out apertures for windows and the like, or pre-cut cripples and headers may be used to assemble frames around apertures for windows and doorways. Similarly, openings may be cut in sheathing material either before or after nailing to the wall frames 22.

Completed wall sections may be pulled along the slideway 52 by the winch 55 and cable 57 for delivery directly to the floor of a building being erected.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A self-contained portable apparatus for constructing a building wall, said building wall having a wall frame comprising a pair of elongate parallel plate members and a plurality of parallel elongate studs disposed transversely between said plate members at predetermined intervals, said apparatus comprising:
   (a) frame means including wheels for transporting said apparatus;
   (b) elongate support means mounted on said frame means for supporting said plate members in horizontally disposed positions spaced apart from and parallel to one another and extending along the length of said support means;
   (c) fastening means located at a predetermined fastening station along the longitudinal sides of said elongate support means, for fastening studs to said plate members;
   (d) stud-placement means disposed in predetermined relation to said support means, for placing studs one-at-a-time upon said support means at said fastening station such that said studs extend transversely between said plate members for fastening thereto by said fastening means, said stud-placement means comprising at least a pair of stud-selecting plates mounted for rotation about an axis oriented transverse to said elongate support means, each of said stud-carrying plates including an arcuate surface for supporting studs, and each of said stud-carrying plates defining a stud-receiving recess having a width sufficient to receive a stud having a predetermined width, said stud-placement means further comprising means for rotating said stud-selecting plates between a stud-receiving position and a stud-fastening position;
   (e) drive means attached to said elongate support means for reciprocating forwardly and rearwardly along the length of said elongate support means and engaging a stud after it has been fastened to said plate members so as to push against said stud and thereby move said stud and plate members longitudinally of said elongate support means through a predetermined distance; and
   (f) adjustable means for varying the overall width of said apparatus between a narrow width for legal highway transport of said apparatus and a greater width corresponding to the height of a building wall being constructed.

2. The apparatus of claim 1 further comprising semi-automatic sheathing fastener means for fastening sheathing to said wall frame, wherein said adjustable means comprises means for folding a portion of said elongate support means and means for carrying said semi-automatic means in a position wherein the length of said sheathing fastener means is generally aligned with the length of said frame.

3. The apparatus of claim 1 including slideway-and-winch means connected with said support means for moving completed sections of said frames from said apparatus to a locater for installation.

4. The apparatus of claim 3 wherein said slideway-and-winch means includes a slideway which is detachable from said apparatus.

5. Apparatus for constructing a building wall, said building wall having a wall frame comprising a pair of elongate parallel plate members and a plurality of parallel elongate studs disposed transversely between said plate members at predetermined intervals, said apparatus comprising:
   (a) elongate support means for supporting said plate members in horizontally disposed positions spaced apart from and parallel to one another and extending along the length of said support means;
   (b) fastening means located at a predetermined fastening station along the longitudinal sides of said elongate support means, for fastening studs to said plate members;
   (c) stud-placement means disposed in predetermined relation to said elongate support means, for placing studs one-at-a-time upon said elongate support means at said fastening station such that said studs extend transversely between said plate members for fastening thereto by said fastening means, said stud-placement means comprising at least a pair of stud-selecting plates mounted for rotation about an axis oriented transverse to said elongate support means, each of said stud-carrying plates including an arcuate surface for supporting studs, and each of said stud-carrying plates defining a stud-receiving recess having a width sufficient to receive a stud having a predetermined width, said stud-placement means further comprising means for rotating said stud-selecting plates between a stud-receiving position and a stud-fastening position; and
   (d) drive means attached to said elongate support means for reciprocating forwardly and rearwardly along the length of said elongate support means and engaging a stud after it has been fastened to said plate members so as to push against said stud and thereby move said stud and plate members longitudinally of said elongate support means through a predetermined distance.

6. The apparatus of either of claims 1 or 5 including adjustable means for varying the effective width of the stud-receiving recess of each said stud-selecting plate.

7. The apparatus of either of claims 1 or 5 including frame squaring means for holding said wall frame with each of said studs perpendicular to said plate members while sheathing is fastened in place on said wall frame.

8. The apparatus of either of claims 1 or 5, further comprising automatic fastener means, mounted on a carriage including means for permitting said carriage to move forwardly and rearwardly along the length of said elongate support means, for fastening sheathing to said plate members and studs, said automatic fastener means comprising a track extending transversely of said elongate support means, transport means for moving along said track, and a plurality of automatic fastener guns carried by said transport means, each of said fastener guns being suspended at a predetermined height relative to said elongate support means, for fastening a sheet of sheathing to said wall frame, said automatic fastener means further comprising cam means associated with said track for actuating said fastener means in response to the position of said transport means.

9. The apparatus of claim 8 including automatic hold-down means for pushing downward against said sheathing and holding said sheathing in contact with said wall frame during fastening of said sheathing to said wall frame.

10. Apparatus for constructing a building wall, said wall having a wall frame comprising a pair of elongate parallel plate members and a plurality of parallel elongate stud members disposed transversely between said plate members at predetermined intervals, said apparatus comprising:
 (a) frame means;
 (b) elongate support means mounted on said frame means for supporting said plate members in horizontally disposed positions spaced apart from and parallel to one another and extending along the length of said support means;
 (c) fastening means located at a predetermined fastening station along the longitudinal sides of said support means for fastening one of said studs to said plate members;
 (d) drive means attached to said elongate support means for reciprocating forwardly and rearwardly along part of the length of said elongate support means and engaging said one of said studs after it has been fastened to said plate members so as to move said one of said studs and said plate members longitudinally of said support means through a distance corresponding to one of said predetermined regularly spaced intervals; and
 (e) stud-placement means disposed in predetermined relation to said support means for placing studs one-at-a-time upon said support means at said fastening station such that said studs extend transversely between said plate members for fastening thereto by said fastening means;
 (f) said stud-placement means comprising at least a pair of stud-selecting plates mounted for rotation about an axis oriented transverse to said elongate support means, each said stud-selecting plate including an arcuate surface for supporting studs, and each said stud-selecting plate defining a stud-receiving recess having a width sufficient to receive a stud having at least a predetermined width, said recess having a depth which is no greater than about equal to the thickness of each stud;
 (g) said stud-placement means further comprising means for rotating said stud-selecting plates between a stud-receiving position and a stud-fastening position; and
 (h) said stud-placement means further comprising a stud-holder dog for holding a stud within said stud-carrying recess during rotation of said stud-selecting plate from said stud-receiving position to said stud-fastening position.

11. The apparatus of claim 10 including reciprocating finger means for holding a stud in said stud-fastening position.

12. The apparatus of claim 10 including reciprocating means for spreading said plates while said stud-placement means places a stud therebetween.

* * * * *

UNITED STATES PATENT AND TRADEMARK OFFICE
CERTIFICATE OF CORRECTION

PATENT NO. : 4,305,538

DATED : December 15, 1981

INVENTOR(S) : Schultz, Bethel F., deceased;

It is certified that error appears in the above-identified patent and that said Letters Patent are hereby corrected as shown below:

| | | |
|---|---|---|
| Col. 6, line 25 | Change "in" to --is--. | |
| Col. 8, line 64 | Change "to" to --top--. | |
| Col. 10, line 32 | Change "27" to --127--, | |
| line 40 | Change "40," to --70,--. | |
| Col. 11, line 14 | Change "by" to --be--, | |
| line 30 | Change "148" to --146--. | |
| Col. 13, line 31 | Change "110," to --110.-- | |
| Col. 14, line 54 | Change "track" to --tracks--. | |
| Col. 16, line 24 | Change "claim 1" to read --either of claims 1 or 5--, | |
| line 27 | Change "locater" to read --location--. | |

Signed and Sealed this

Thirteenth Day of July 1982

[SEAL]

Attest:

GERALD J. MOSSINGHOFF

Attesting Officer    Commissioner of Patents and Trademarks